Patented Jan. 6, 1942

2,269,096

UNITED STATES PATENT OFFICE 2,269,096

CEMENT POWDERS AND METHOD OF PRODUCING ACIDPROOF MORTARS THEREFROM

Karl Dietz, Kronberg in Taunus, and Franz Privinsky, Hofheim in Taunus, Germany, assignors, by mesne assignments, to Pen-Chlor, Incorporated, Philadelphia, Pa., a corporation of Delaware No Drawing. Application July 29, 1939, Serial No. 287,252. In Germany August 1, 1938

14 Claims. (Cl. 106—84)

The present invention relates to cement powders and to a method of producing acid-proof mortars therefrom.

In recent times acid-proof mortars made with the aid of water-glass solutions are chiefly used in constructions which are to be resistant to acids. These acid-proof mortars have the property of self-hardening and when bricks are cemented with said mortars there are obtained cementations which are acid-proof and water-proof as well as resistant to dilute acid water. For these mortars there are chiefly used cement powders to which alkali-reactive substances have been added; these additions are obtained from fluorine compounds. Already a relatively small amount of these substances added to the cement powder is sufficient for producing the above-named properties. In most cases sodium silicate solutions are added to the cement powders for producing the mortars of the kind described above.

In some cases, however, the above-named mortars have not been found useful in acid-proof constructions and this particularly when containers which are built with acid-proof bricks cemented with acid-proof mortars or when acid-proof linings are exposed to chemical processes which are performed by causing the substances to circulate. Moreover, the presence of fluorine or of potassium hydroxide in the cementations may be dangerous if the cementations are brought in contact with sulfuric acid.

Now we have found that self-hardening acid-proof and water-resistant water-glass mortars can be prepared which do not show the aforenamed drawbacks by using as an addition which causes the self-hardening aromatic sulfochlorides, for instance benzene-sulfochloride, para-toluene-sulfochloride, meta-nitrobenzene-sulfochloride, ortho-nitrotoluene-sulfochloride or alpha- and beta-naphthalene-sulfochloride, instead of the known alkali-reactive additions. The cement powders are mixed with potassium silicate. When small amounts of these aromatic sulfochlorides are added to the cement powders, there are obtained mortars and cements which, when hardened, are entirely resistant to acids, to acid water and especially to sulfuric acid or to water containing sulfuric acid. Cementations of this kind are likewise permanently stable, even in circulation processes.

The sulfochlorides are suitably added to the cement powder which advantageously likewise contains acid-proof filling agents; when used this cement powder is mixed with liquid potassium silicate solution. If one of the sulfo-chlorides has a low melting point so that it is liquid at the temperature at which it is used, it is suitably incorporated into the cement powder after having been absorbed in kieselguhr.

It has been found to be particularly suitable to use for mixing the pulverized constituents of the mortar a water-glass solution in which the proportion by weight of $SiO_2:H_2O$ exceeds 1:3.5. It is suitable to use a water-glass solution in which the proportion by weight of $SiO_2:H_2O$ is between 1:3.0 and 1:2.5, as described in our copending U. S. application Serial No. 224,318 filed August 11, 1938. When using a water-glass solution of this kind it is possible to obtain cements which are completely impermeable to liquids.

It is also possible to add the potassium silicate in the form of a powder together with the other constituents to the cement powder which when used is then mixed with water.

The following examples serve to illustrate the invention, but they are not intended to limit it thereto, the parts being by weight:

(1) 90 parts of pulverized quartz are mixed with 5 parts of clay and 5 parts of para-toluene-sulfochloride in the pulverized condition. For use 25 cc. of potassium silicate solution of the specific gravity of 30° Bé. are added to the mixture. The composition of the potassium silicate solution is as follows: 8 per cent of $K_2O$, 20 per cent of $SiO_2$ and 72 per cent of $H_2O$.

After hardening the cements obtained with the aid of this mortar are resistant to acids of all kinds, particularly also to sulfuric acid and acetic acid.

(2) In a cement powder as described in Example 1 the quantity of para-toluene-sulfochloride is replaced by the same proportion by weight of benzene-sulfochloride which before mixing it with the cement powder is absorbed in the liquid condition by 2 per cent of kieselguhr calculated upon the cement powder. In consequence thereof only 88 per cent of pulverized quartz are used. The cement powder is worked up as described in Example 1. The cements obtained have the same properties as those of Example 1.

(3) A cement powder is prepared from 8 parts of para-toluene-sulfochloride, 5 parts of clay and 62 parts of pulverized quartz, 25 parts of solid potassium silicate powder are added thereto. In this potassium silicate powder the proportion by weight of $SiO_2:H_2O$ is 2.5:1; the powder has a moisture content of 25 per cent. When being used the cement powder is mixed with water. The cements obtained have the same properties as those of Example 1.

(4) 2 parts of clay and 8 parts of para-toluene-sulfochloride are added to 90 parts of a mixture of acid-proof additions (pulverized quartz, siliceous sinter, clay and granulated quartz). The whole is mixed with 30 parts by volume of a potassium silicate solution of 35° Bé.; the proportion by weight of $SiO_2:H_2O$ of this potassium silicate solution is 1:2.8. It has a content of 10.5 per cent. of $K_2O$, 23.5 per cent of silicic acid and 66 per cent. of water. The cements obtained are resistant particularly to sulfuric acid and acetic acid and are completely impermeable to liquids.

Other aromatic sulfochlorides may be used instead of para-toluene-sulfochloride.

We claim:

1. A method of producing acid-proof mortars which consists in mixing cement powders consisting of pulverulent aromatic sulfochlorides and acid-proof filling substances with potassium silicate and water.

2. A method of producing acid-proof mortars which consists in mixing cement powders consisting of pulverulent aromatic sulfochlorides selected from the group consisting of benzene sulfochloride, para-toluene sulfochloride, meta-nitrobenzene sulfochloride, ortho-nitrotoluene sulfochloride, alpha-naphthalene sulfochloride and beta-naphthalene sulfochloride, and acid-proof filling substances with potassium silicate and water.

3. A method of producing acid-proof mortars which consists in mixing cement powders consisting of liquid benzene sulfochloride absorbed in diatomaceous earth and acid-proof filling substances with potassium silicate and water.

4. A method of producing acid-proof mortars which consists in mixing cement powders consisting of pulverulent aromatic sulfochlorides and acid-proof filling substances with liquid potassium silicate solution.

5. A method of producing acid-proof mortars which consists in mixing cement powders consisting of pulverulent aromatic sulfochlorides and acid-proof filling substances with liquid potassum silicate solution in which the proportion of $SiO_2$ to $H_2O$ is greater than 1 to 3.5.

6. A method of producing acid-proof mortars which consists in mixing cement powders consisting of pulverulent aromatic sulfochlorides and acid-proof filling substances with liquid potassium silicate solution in which the proportion of $SiO_2$ to $H_2O$ lies between 1 to 3.0 and 1 to 2.5.

7. A method of producing acid-proof mortars which consists in mixing cement powders consisting of pulverulent aromatic sulfochlorides selected from the group consisting of benzene sulfochloride, para-toluene sulfochloride, meta-nitrobenzene sulfochloride, ortho-nitrotoluene sulfochloride, alpha-naphthalene sulfochloride and beta-naphthalene sulfochloride, and acid-proof filling substances with liquid potassium silicate solution.

8. A method of producing acid-proof mortars which consists in mixing cement powders consisting of pulverulent aromatic sulfochlorides selected from the group consisting of benzene sulfochloride, para-toluene sulfochloride, meta-nitrobenzene sulfochloride, ortho-nitrotoluene sulfochloride, alpha-naphthalene sulfochloride and beta-naphthalene sulfochloride, and acid-proof filling substances with liquid potassium silicate solution in which the proportion of $SiO_2$ to $H_2O$ is greater than 1 to 3.5.

9. A method of producing acid-proof mortars which consists in mixing with water cement powders consisting of pulverulent aromatic sulfochlorides, acid-proof filling substances and pulverulent potassium silicate.

10. A method of producing acid-proof mortars which consists in mixing with water cement powders consisting of pulverulent aromatic sulfochlorides selected from the group consisting of benzene sulfochloride, para-toluene sulfochloride, meta-nitrobenzene sulfochloride, ortho-nitrotoluene sulfochloride, alpha-naphthalene sulfochloride and beta-naphthalene sulfochloride, acid-proof filling substances and pulverulent potassium silicate.

11. A cement powder which, when mixed with liquid potassium silicate solution, yields acid-proof mortars, said cement powder consisting of pulverulent aromatic sulfochlorides and acid-proof filling substances.

12. A cement powder which, when mixed with liquid potassium silicate solution, yields acid-proof mortars, said cement powder consisting of pulverulent aromatic sulfochlorides selected from the group consisting of benzene sulfochloride, para-toluene sulfochloride, meta-nitrobenzene sulfochloride, ortho-nitrotoluene sulfochloride, alpha-naphthalene sulfochloride and beta-naphthalene sulfochloride, and acid-proof filling substances.

13. A cement powder which, when mixed with water, yields an acid-proof mortar, said powder consisting of pulverulent aromatic sulfochlorides, acid-proof filling substances and pulverulent potassium silicate.

14. A cement powder which, when mixed with water, yields an acid-proof mortar, said powder consisting of pulverulent aromatic sulfochlorides selected from the group consisting of benzene sulfochloride, para-toluene sulfochloride, meta-nitrobenzene sulfochloride, ortho-nitrotoluene sulfochloride, alpha-naphthalene sulfochloride and beta-naphthalene sulfochloride, acid-proof filling substances and pulverulent potassium silicate.

KARL DIETZ.
FRANZ PRIVINSKY.